: 2,745,843
Patented May 15, 1956

2,745,843

PROCESS FOR THE PURIFICATION OF THIOPHENE

Leonard S. Levitt, Drexel Hill, Pa.

No Drawing. Application May 7, 1952,
Serial No. 286,617

3 Claims. (Cl. 260—332.8)

The present invention relates to the purification of the compound known as thiophene.

Methods have been devised recently for the cheap quantity production of thiophene, but the product obtained is invariably contaminated with foul-smelling, sulfur-containing impurities. The strong odor, due probably to certain mercaptans and sulfides, cannot be removed by any previously known commercially feasible procedure, such as shaking with dilute base or acid, or by fractionating in a distilling column, or by preferential adsorption on silica, alumina or related substances. In addition to the odor, the thiophene obtained in large scale production generally has a slight yellow tinge. Perfectly pure thiophene, however, is a water-clear liquid having a pleasant aromatic odor much like that of benzene.

The only previously available methods for purification of thiophene are not applicable to large-scale industrial preparations because the reagents needed make the cost prohibitive. One such method, suitable to small-scale laboratory preparations, requires refluxing the thiophene over metallic sodium, and another involves precipitating the thiophene as the mercuric acetate derivative, separating the precipitate and regenerating the thiophene by subsequent decomposition of the mercuric compound.

After an extended investigation, I have discovered that impure commercial thiophene can be quickly and efficiently purified by reacting it with dilute nitric or nitrous acid or the oxidizing nitrogen oxides $N_2O_5$, $N_2O_4$, $N_2O_3$, $NO_2$, and $NO$. I have found that with proper control of concentration, temperature and time, the reaction may be restricted to the oxidation and decomposition of the sulfur-containing impurities, but that on prolonged contact with the reagent, the thiophene itself will be destroyed. Concentration, temperature and time are therefore critical to this purification process. The following examples will serve for illustrative purposes.

*Example I*

50 g. of commercial thiophene were placed in a round bottom glass flask and 50 ml. of 4 N aqueous nitric acid were added. The mixture consisted of two layers, the thiophene being on top, and was heated on a steam bath to about 80° C., and after approximately 3 minutes, both the layers changed to a deep yellow-orange color. The mixture was then poured into cold water to stop the reaction, and the thiophene layer separated from the aqueous layer by means of a separatory funnel. The thiophene, which was yellow-orange at this point, was next washed with 30 ml. of 10% $Na_2CO_3$ solution in a separatory funnel to neutralize the excess nitric acid; separated from the water layer; dried over anhydrous $CaCl_2$ and distilled. The distillate, boiling between 83.5° and 84.5° C., was water-clear with the odor of benzene and weighed 49.1 g. The yield of pure thiophene obtained was 98.2%.

*Example II*

30 g. of commercial thiophene were placed in a round bottom glass flask fitted with a reflux condenser and 70 ml. of 2 N nitric acid were added. The two-phase mixture was then refluxed on a steam bath until it turned a yellow-orange color, which took about 20 minutes. The mixture was then cooled and the oily thiophene layer separated from the water layer by means of a separatory funnel, after which it was washed with 20 ml. of 10% $Na_2CO_3$ solution, again separated, dried over $CaCl_2$ and distilled. The yield of pure thiophene was 28.0 g., representing 94% of the original thiophene.

*Example III*

A mixture of the brown fumes containing essentially the mixed nitrogen oxides of $N_2O_5$, $N_2O_4$, $N_2O_3$, $NO_2$, and $NO$ obtained by the action of concentrated $HNO_3$ on copper metal was bubbled with constant stirring into a suspension of 50 g. of thiophene in 100 ml. of $N_2O$ until the thiophene layer turned yellow-orange, whereupon the reaction was stopped and the thiophene layer separated, dried and distilled. The yield of pure thiophene was 47 g. representing 94% of the original thiophene.

*Example IV*

75.0 g. of crude thiophene was suspended in 100 ml. of 4 N $H_2SO_4$ solution and 10 g. of $NaNO_2$ was added gradually with shaking. Brown fumes of $NO_2$ resulting from the decomposition of the $HNO_2$ were immediately observed and the thiophene layer immediately acquired a light green color which turned subsequently to a deeper green, and on slight heating and further agitation for about 5 minutes, the thiophene finally became yellow-orange as in the previously described examples. On separating, washing, drying and distilling, as previously described, 73.5 g. of pure thiophene were obtained corresponding to a 97.5% yield based on the crude product.

The temperatures employed in carrying out this procedure may range from room temperature, 25° C., to 84° C., the boiling point of the thiophene, and depends on other factors such as duration of the reaction, concentration of the nitric acid or oxide used, etc. Thus, with concentrated $HNO_3$ and crude thiophene, shaking together for 30 sec. without application of any outside source of heat, will generally suffice; with 12 N acid under the same conditions, a few minutes may be necessary; with 8 N acid and heating on a steam bath, a minute or two is sufficient, but without heating, 5 or 10 minutes may be necessary.

Depending on the concentration or reagent used, the color changes to a yellow-green or a yellow-orange. The materials which impart the color to the thiophene layer constitute only a very small portion of the layer and always remain in the flask at the end of the final distillation from which the purified thiophene is obtained. This small residue is a very deep red or deep green color, almost black in appearance, and has an extremely foul onion or garlic-like odor. The residue is apparently composed of all of the original impurities in the thiophene, along with their decomposition and oxidation products, including also small quantities of nitro- and dinitrothiophene.

Due to the formation of some nitro- and dinitrothiophene and oxidation products of thiophene, prolonged reaction should be avoided after the initial decomposition of the impurities, as this will decrease the yield of purified thiophene, and if allowed to proceed indefinitely, would lead to the complete oxidative decomposition of all of the thiophene into $SO_2$, $SO_3$, $(COOH)_2$, $CO_2$, etc. and thus defeat the purpose of this purification process.

It may thus be seen that the proper control of the reaction under different conditions of temperature, concentration and length of time are critical to the success of this process, and in general, it may be stated that the proper time to stop the reaction in all cases is when the thiophene layer has taken on a deep yellow or yellow-orange or yellow-green color. If stopped before this point, some impurity will remain in the final distilled thiophene and it will still retain some of its original foul odor. If allowed to proceed much beyond this point, more and more of the thiophene will be destroyed and the yield correspondingly cut down.

Although $HNO_3$ of concentration of about 1 to about 16 N is satisfactory to use in this process, I have found the optimum and most convenient concentration to be in the range of about 4 to about 8 N. The acid solution can, industrially, be used over and over again since very little of it is consumed in reaction with the small quantity of impurities.

Of the oxides of nitrogen, the most readily available and the cheapest, commercially, are NO and $NO_2$ which both react in like manner in presence of air since the former is oxidized to the latter. Under the conditions of the present process, starting with a water suspension of thiophene, the $NO_2$ reacts with the water to form a mixture of nitric and nitrous acids and thus is probably the most advantageous of the reagents as far as industrial use is concerned. $N_2O_5$ is at present costly and reacts violently on thiophene unless put into water, in which case it becomes $HNO_3$. Liquid $N_2O_4$ is the dimer of gaseous $NO_2$ and is stable only at low temperature or under pressure and is therefore generally inconvenient.

The specific examples herein given are intended to be merely illustrative examples of practicing my invention. It is to be understood that, as previously explained, the conditions can be greatly varied depending upon the reagents used, the extent of purification desired, etc. The process may be carried out as a batch process or continuously, using suitable standard apparatus for such purpose. The thiophene mixture, after treatment with the oxidizing nitrogen-oxide-containing reagent, may be separated from the oxidation products and other impurities in any suitable manner. As previously explained, any residual acid present may be neutralized with any suitable alkaline reagent such as sodium carbonate, caustic soda, ammonia, lime, and the like; but it is possible, though not desirable, to distill the thiophene directly without such neutralization, or to simply wash the acidic thiophene with water, and still obtain a reasonably purified product. Any residual water may be removed by a suitable dehydrating agent such as calcium chloride, lime, aluminum oxide and the like, or by mechanical separation using a centrifuge if desired. The pure thiophene is then obtained by distilling same in any conventional apparatus so as to separate same from the oxidation products and other impurities which may be present.

I claim:

1. The process of purifying commercial thiophene containing foul smelling organic sulfur compounds as impurities which comprises treating said thiophene with aqueous nitric acid of a concentration in the range of about 1 N to about 16 N at a temperature of about 25° to 84° C. for a sufficient time to produce a yellow-orange color, cooling the mixture, separating the thiophene phase from the water phase and distilling said thiophene to yield a purified thiophene free of the objectionable odor.

2. The process of purifying commercial thiophene containing foul smelling organic sulfur compounds as impurities which comprises treating said thiophene in the presence of water with an oxidizing nitrogen oxide-containing compound selected from the group consisting of $N_2O_5$, $N_2O_4$, $N_2O_3$, $NO_2$, NO, $HNO_2$ and $HNO_3$ at a temperature of about 25° to 84° C. for a sufficient time to produce a yellow-orange color, cooling the mixture, separating the thiophene phase from the water phase and distilling said thiophene to yield a purified thiophene free of the objectionable odor.

3. The process of purifying commercial thiophene containing foul smelling organic sulfur compounds as impurities which comprises treating said thiophene with aqueous nitric acid of a concentration in the range of about 4 N to about 8 N at a temperature of about 25° to 84° C. for a sufficient time to produce a yellow-orange color, cooling the mixture, separating the thiophene phase from the water phase and distilling said thiophene to yield a purified thiophene free of the objectionable odor.

References Cited in the file of this patent

UNITED STATES PATENTS

| Number | Name | Date |
|---|---|---|
| 2,101,998 | Haag et al. | Dec. 14, 1938 |
| 2,349,514 | Moyer | May 23, 1944 |
| 2,464,345 | Rainalter | Mar. 15, 1949 |
| 2,586,777 | Bond | Feb. 26, 1952 |